March 16, 1937.　　J. B. FRANKS, JR　　2,073,836
FLUID CONTROL VALVE
Filed Nov. 15, 1934　　2 Sheets-Sheet 1
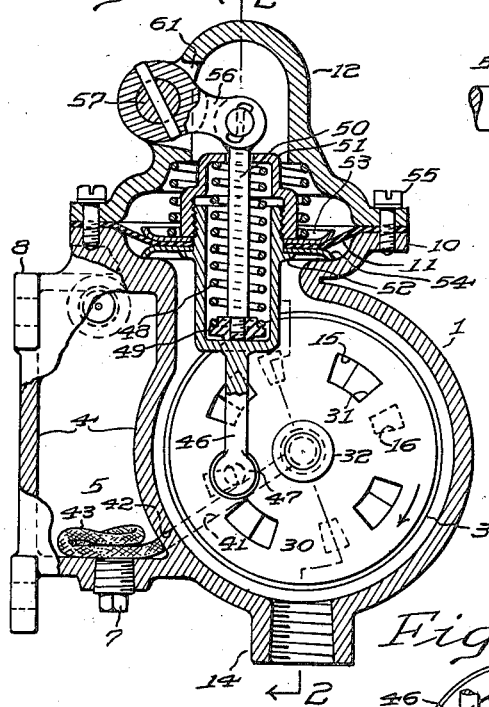
Fig. 1
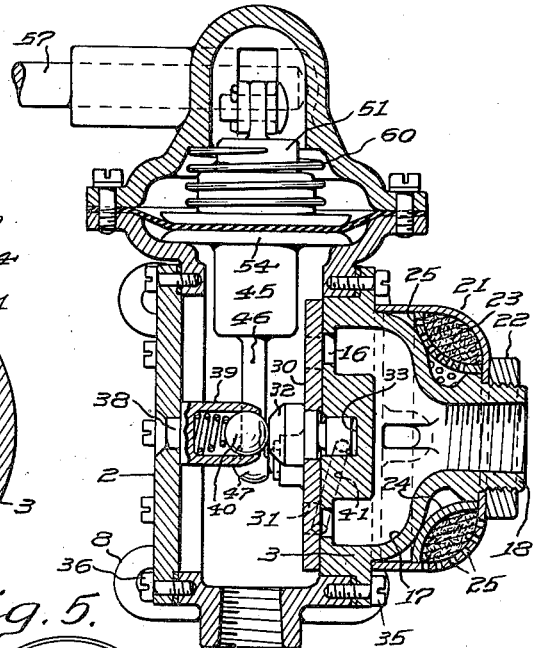
Fig. 2.
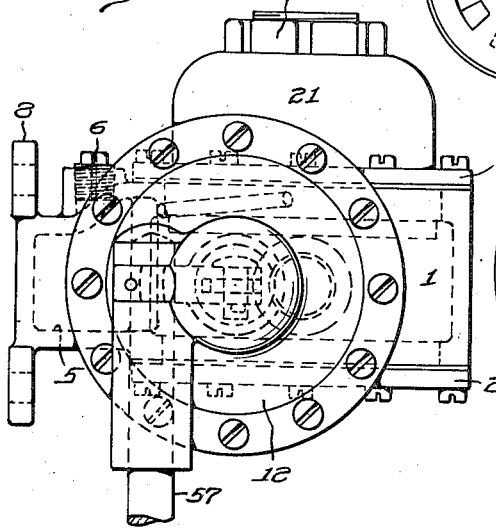
Fig. 3.
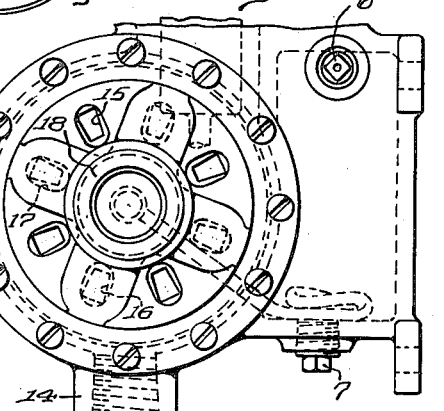
Fig. 4.
Fig. 5.
WITNESS
F. J. Hartman.
INVENTOR
James B. Franks Jr.
BY George K. Helbert
ATTORNEY March 16, 1937.  J. B. FRANKS, JR  2,073,836
FLUID CONTROL VALVE
Filed Nov. 15, 1934  2 Sheets-Sheet 2
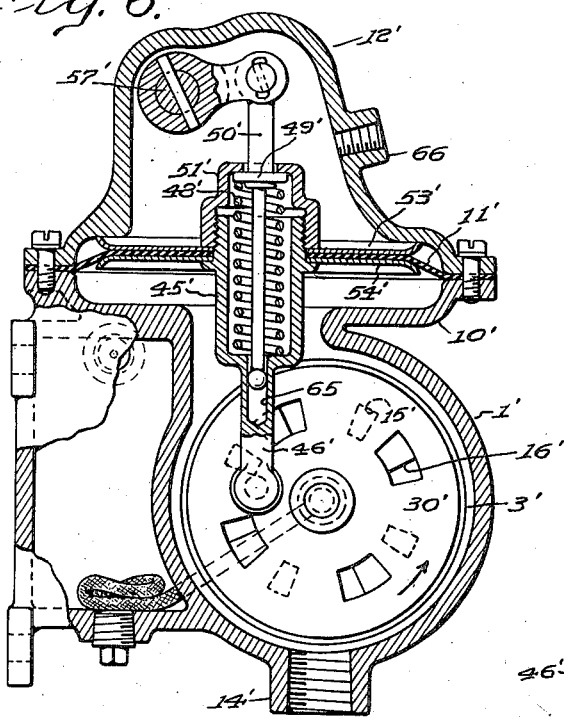
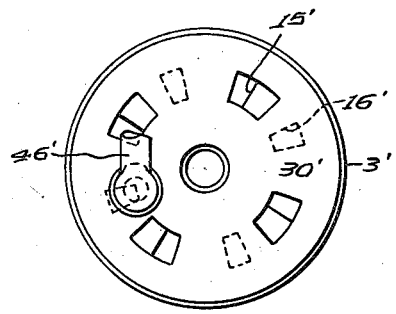
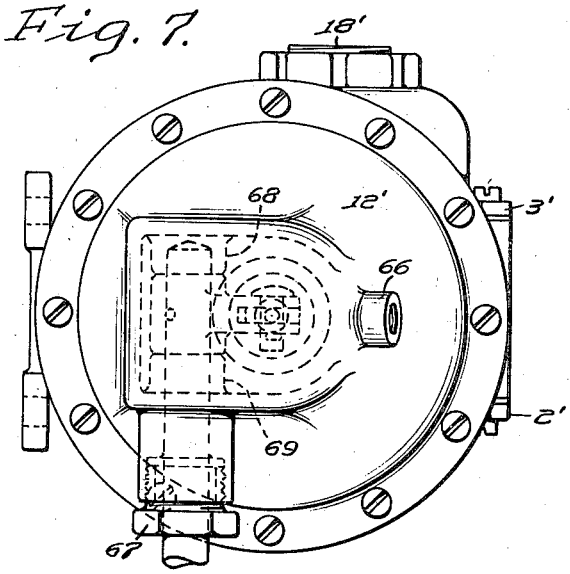
WITNESS
F. J. Hartman.
INVENTOR
James B. Franks Jr.
BY George K. Stellit
ATTORNEY Patented Mar. 16, 1937

2,073,836

UNITED STATES PATENT OFFICE 2,073,836

FLUID CONTROL VALVE

James B. Franks, Jr., Philadelphia, Pa.

Application November 15, 1934, Serial No. 753,098

11 Claims. (Cl. 303—54)

This invention relates to valves for controlling the flow of fluids, especially the flow of air at sub-atmospheric pressures, and is particularly directed to the provision of a valve for controlling the operation of automotive vehicle brakes deriving energy through the reduced pressure set up in the motor intake manifold during operation of the motor.

Brakes of this character are well known in the art and generally comprise a relatively movable cylinder and piston arranged to actuate the brakes in response to a pressure differential in the cylinder on opposite sides of the piston, and manually operated valves of various types have heretofore been proposed for establishing this pressure differential by control through the valve of the vacuum derived from the motor manifold. Insofar as I am aware, however, no valve has heretofore been fully satisfactory for this purpose, the difficulty of controlling the vacuum so as to permit a positive partial application of the brakes constituting a serious obstacle on account of the rapidity of the air flow through even a small port when maximum vacuum is available, resulting in too severe an application of the brakes even when the control mechanism is actuated by the operator with the greatest care.

A principal object of the present invention, therefore, is the provision of an improved fluid valve having means for automatically opening and closing the valve ports to maintain in the mechanism connected to one side of the valve and controlled thereby a substantially constant fluid pressure different from that on the other side of the valve, even when leakage or other factors are present tending to modify said pressure, the pressure thus maintained being under the control of the operator at all times, and capable of being changed by manipulation of suitable valve control mechanism when desired.

A further object is to provide a fluid valve especially adapted for vacuum brake control which is automatically operative to interrupt the flow of fluid through it when pressure conditions are such that, in accordance with the amount of movement of the valve actuating mechanism, the desired effect is produced in the brakes.

Another object of the invention is to provide a manually operable valve including means influenced by the fluid pressure change produced as a result of operation of the valve adapted to automatically actuate certain valve parts in a direction opposite to that in which they were manually operated in producing such change, whereby when the said parts are moved manually to a desired setting from any other position, the corresponding change in the pressure conditions thereby produced is thereafter automatically maintained until the manual control mechanism is again operated.

Other objects, purposes and advantages of the invention will hereinafter more fully appear or will be understood from the following description of certain embodiments thereof as illustrated in the accompanying drawings, in which:

Fig. 1 is a vertical section partly in elevation showing a valve adapted for controlling an automotive vehicle vacuum brake of a usual type.

Fig. 2 is a staggered section thereof on the line 2—2 in Fig. 1.

Fig. 3 is a top plan view of the valve.

Fig. 4 is a fragmentary side elevation thereof with certain parts omitted for clearness of illustration.

Fig. 5 is a fragmentary view on a reduced scale of a portion of the mechanism shown in Fig. 1 but with the parts in different relative positions.

Fig. 6 is a vertical section corresponding to Fig. 1 showing another valve adapted for controlling a vacuum brake of a different type.

Fig. 7 is a top plan view thereof, and

Fig. 8 is a fragmentary view on the same scale as Figs. 6 and 7 but otherwise generally corresponding to Fig. 5.

In the several figures, like characters are used to designate the same parts.

In passenger automobiles now generally in use, pressures as low as 10 in. of mercury are commonly developed in the motor intake manifold in normal operation, while vacuum brake mechanisms capable of applying the brakes with maximum useful force, i. e., that sufficient to lock the wheels on a dry road, with a working pressure of about 20 in. of mercury, are usually considered satisfactory from a safety standpoint and are readily available for use with such vehicles.

This marked difference between the vacuum available and that required, while providing an adequate margin of safety, has heretofore rendered brakes of such character difficult to control with precision because of the low viscosity of the fluid, air under reduced pressure, by which they are operated, since the use of small ports in the valves is undesirable because, among other things, they prevent rapid application of the brakes when necessary and also tend to become clogged with foreign particles.

In accordance with my invention, however, I provide a valve by means of which a suitable pressure in the brake system may be set up and maintained independent of the greater vacuum created by the motor or other source of energy supply, and to this end I utilize in the preferred embodiments of the invention shown in the drawings and hereafter more fully described, disk valves, each comprising a stationary part having a plurality of vacuum ports and a like number of atmosphere ports and a movable part provided with ports selectively adapted to register with the said vacuum or atmosphere ports, together with means for actuating the movable part, including mechanism for interconnection with an operating pedal or the like, and means operated in accordance with pressure conditions set up within the valve for modifying the influence of the pedal upon the movable part, usually by effecting relative movement of said part with respect to the pedal in the direction opposite that in which the part was moved thereby in operating the valve.

Referring now more particularly to the drawings, each of the valves shown therein is adapted for connection by suitable fluid conduits respectively with a source of fluid energy such as the intake manifold of an internal combustion motor, with or without an intervening vacuum reservoir as desired, and with suitable mechanism such as a brake operating cylinder or the like actuated by such fluid energy or vacuum under control of the valve, the valves being arranged for actuation through suitable mechanical linkage by a foot pedal or the like under the control of the operator of the vehicle. As these several mechanisms and the manner of their association and interconnection with the valves form no part of my invention and will be readily understood by those skilled in the art, specific description or illustration thereof would be superfluous.

Thus, the valve shown in Figs. 1–5 inclusive, comprises a housing 1, which may be a brass casting or the like, forming a substantially cylindrical outer wall of a valve chamber and providing an annular seat at one side for a cover plate 2 and at the other side a substantially similar seat for the stationary ported valve part 3.

The housing may also desirably comprise webs 4 forming an integral closed lubricant reservoir 5 having a filler hole closed by a breather plug 6 and a drain hole closed by a plug 7, and supporting lugs 8 integral with but extending outwardly from the rear wall of the reservoir whereby the valve may be bolted to the dashboard of an automobile or other suitable support.

Adjacent but above the valve chamber the housing is provided with an integral substantially annular flange 10 forming a seat for the margin of a flexible diaphragm 11 and cap 12, the purposes of which will hereafter appear, and below it with a boss 14 bored and threaded to provide a port for connection of suitable piping leading from the chamber to the brake cylinder or other fluid actuated mechanism.

The valve part 3 is preferably formed in one piece, and has one or more atmosphere ports 15 extending from its plane inner face to its opposite side, and a corresponding number of vacuum ports 16, alternating with the atmosphere ports, interconnected through ducts 17 with a bored and internally threaded boss 18 for connection with the source of vacuum.

The valve part 3 is also desirably provided with an air filter formed by an annular cap 21, secured in place by a collar 22 threaded on the boss 18, containing a quantity of oily metal wool 23 or other filtering material held in place by means of a curved ring 24. The ring 24 and the cap 21 are provided with perforations 25 on one side only of a diameter of each, and are assembled with these perforations diametrically opposed, so as to provide a relatively long travel through the filter for air entering through the perforations in the cap and passing through those in the ring and into the valve through the atmosphere ports 15.

The movable valve port or disk 30 overlies the plane inner face of the valve part 3 which forms its seat and is provided with one or more enlarged ports 31 respectively adapted to register with either an atmosphere or a vacuum port in the valve part 3 as the disk is rotated about a pivot at its axis formed by a headed pin 32 seated in a bore 33 in the center of that valve part. The latter and the cover plate 2 are respectively secured to opposite sides of the housing by cap screws 35, 36, and the cover plate supports at its center from a peened-over stud 38, a thimble 39 holding a spring pressed ball 40 adapted when the parts are assembled to engage the head of pin 32 to urge it, and hence the valve disk 30, toward the plane face of valve part 3, whereby a snug engagement of the valve disk on its seat is maintained and leakage therebetween is inhibited.

In valve part 3 extending downwardly and outwardly from bore 33 in its center, is a smaller bore 41 registering in the assembled valve with a hole 42 through the wall of housing 1 communicating with the lubricant reservoir 5, and a wick 43 is carried through the holes from the reservoir into bore 33 and supplies fluid lubricant from the former to pin 32 and the mutually engaging faces of the valve by capillary action and/or difference in pressure between bore 33 and reservoir 5.

The mechanism provided for actuating the valve disk to selectively open and close the atmosphere and vacuum ports comprises a cylinder 45 and a connecting rod 46 integral therewith, its lower end having a ball and socket or other universal joint connection 47 to the disk. A spring 48 in the cylinder bears at one end against a collar 49 secured to the lower end of a rod 50, and at its other end against the interior of a cylinder cap 51 threaded on the upper open end of the cylinder and having an enlarged hole in its center through which rod 50 loosely extends. The lower end of the cap cooperates with a flange 52 on the cylinder to clamp thereto a pair of stop plates 53, 54, embracing the central portion of diaphragm 11, the outer edge of which is clamped to its seat on flange 10 by housing cap 12 secured by cap screws 55.

The rod 50 extends upwardly beyond cylinder cap 51 and is pivotally secured to an actuating arm 56 carried by a horizontal shaft 57 journaled in housing cap 12 and provided with suitable connections (not shown) for oscillating the shaft about its axis in correspondence with movements of the brake pedal. A spring 60, disposed within cap 12, bears against the upper stop plate 53 to urge the diaphragm downwardly and thus assists its movement in one direction under the influence of a pressure differential on opposite sides of the diaphragm, the interior of the cap above the diaphragm being open to atmospheric pressure through the slot 61 provided therein for arm 56.

In describing the operation of this valve, shown in normal or inoperative position in Figs. 1 and 2, it will be assumed that it is connected through the boss 18 with a vacuum source such as a reservoir maintained under reduced pressure by connection with the motor intake manifold, or directly with the intake manifold itself, and through the boss 14 with the closed end of an open-end brake cylinder, and that shaft 57 is arranged to be actuated from a brake pedal under the control of the operator.

In this position of the valve, the ports 31 in the valve disk register with the atmosphere ports 15, while the "lands" between the disk ports cover vacuum ports 16 and prevent loss of vacuum. Atmospheric pressure thus obtains in the valve chamber in housing 1 and in the brake cylinder, and the brakes are inoperative.

To apply the brakes, the pedal is depressed, turning shaft 57 about its axis so as to raise rod 50; as spring 48 is considerably stronger than spring 60, this operation raises the cylinder 45 and rotates valve disk 30 in the direction of the arrow in Fig. 1, thus initially closing the atmosphere ports by moving the disk ports out of registry therewith. The disk ports are of slightly less width than the area between the atmosphere ports and their respectively adjacent vacuum ports, this difference preferably being about 0.015", so that for a very short time after the atmosphere ports are closed by the disk, the vacuum ports also remain closed. Immediately thereafter, however, on continued movement of the disk, they are opened to an extent determined by the position to which the pedal is moved, and the pressure within the valve chamber as well as in the brake cylinder is accordingly immediately reduced through these ports.

Upon reduction of the pressure in the valve chamber, diaphragm 11 is depressed by the atmospheric pressure above it, and as it moves downwardly, it carries with it cylinder 45, compressing spring 48, and rotates the valve disk in the opposite direction until the vacuum ports are closed, when further pressure reduction ceases and downward movement of the diaphragm is arrested. Thereafter, as long as the pedal is held in the same position, a constant reduced pressure is maintained in the valve chamber in the absence of leakage or other factors tending to vary it, but if, for any reason, this pressure rises, the diaphragm is immediately lifted by spring 48 because of the decreased pressure differential on its opposite sides, and opens the vacuum ports to restore in the system the reduced pressure corresponding to that particular setting of the pedal. On the other hand, when for any reason the pressure in the system is reduced below that for which the pedal is set, the diaphragm is depressed by the increased differential, now beyond normal for that setting of the pedal, and opens the atmosphere ports to admit air to the valve chamber until the pressure therein rises sufficiently to cause the diaphragm to move upwardly under the influence of spring 48 and again close these ports. Thus, leakage of air either into or out of the system or other factors which would induce pressure variations therein are so rapidly compensated by the action of the diaphragm and associated parts that a substantially constant sub-atmospheric pressure, corresponding to any particular position or setting of the pedal, which pressure may be and usually is different from that of the vacuum source, is maintained in the system as long as the pedal is held in that position.

The lower end of spring 48, as explained, is supported from rod 50 which is under control of the operator through the brake pedal and the force of the spring tending to raise the diaphragm is therefore correspondingly controlled; the pressure at which the vacuum ports are closed and the air ports are opened in the compensating oscillations of the diaphragm is thus directly proportioned to the extent to which shaft 57 is turned by the pedal. It is evident the spring tension must be increased substantially in proportion to the decrease of pressure below atmospheric which is to be maintained in the brake cylinder in applying the desired force to the brakes, and the reaction of the spring against the pedal and in turn against the operator's foot consequently continually affords an indication of the magnitude of the force being applied to the brakes. However, the small area of the diaphragm compared to that of the brake cylinder piston and the mechanical advantage afforded by the linkage between the pedal and shaft 57 reduce the force reacting against the operator's foot to a small fraction of that acting upon the brake cylinder piston, but, while the effort required to apply the brakes is thus relatively slight, it is nevertheless sufficient to permit easy detection of variations indicative of the different amounts of force correspondingly applied to the brakes by their operating piston.

The valve shown in Figs. 6-8 inclusive operates on substantially similar principles, but is designed particularly for a brake system of the type, generally referred to as the "suspended in vacuum type", characterized by a closed brake cylinder in which full vacuum is normally maintained on both sides of its piston and the brakes are applied by admitting air to the cylinder at one end to increase the pressure on one side only of the piston and cause it to move toward the other end of the cylinder.

This valve is therefore adapted when in normal position to maintain full vacuum in the cylinder and when actuated by the brake pedal to admit air to the system, and comprises a housing 1', cover plate 2', stationary valve part 3', and valve disk 30' substantially similar to their respective corresponding parts in the valve heretofore described, although the valve disk is in this instance normally maintained in the position shown in Fig. 6 in which the vacuum ports 16', connected to the vacuum source through boss 18', are open to the valve chamber and the atmosphere ports 15' are closed. The flange 10' on the housing is of somewhat larger diameter than flange 10, but similarly forms a seat for the diaphragm 11' embraced between stop plates 53', 54' clamped to cylinder 45' by its cap 51'. The spring 48' in this cylinder, however, bears at its lower end against the cylinder head, and at its upper end against a collar 49' on rod 50' while the lower end of the latter extends into a guide bore 65 in the connecting rod 46' beneath it.

The interior of the housing cap 12' which clamps the outer edges of the diaphragm 11' to flange 10' is connected to the vacuum line through a boss 66, and is not open to the atmosphere; to prevent leakage of air into the cap, the actuating shaft 57' is therefore entered through a packing gland 67 and is journaled in bosses 68, 69 within the cap.

Thus, the spaces above and below the diaphragm are normally maintained at full vacuum, and the brake cylinder as well, one end of the latter being connected to the valve through boss 14' in the housing and the other directly to the vacuum source. When the foot pedal is operated to apply the brakes by admitting air to that end of the cylinder connected to the valve, movement of the pedal turns shaft 57' to depress diaphragm 11' and cylinder 45' and thereby moves the valve disk in the direction of the arrow in Fig. 6, for example, to the position shown in Fig. 8, in which the vacuum ports are closed and the atmosphere ports opened. The resultant increase of pressure within the valve below the diaphragm and at one end of the brake cylinder causes immediate application of the brakes, and also moves diaphragm 11' upwardly against the force of spring 48' until the ensuing movement of the valve disk in the opposite direction again closes the atmosphere ports. Thereafter, with full vacuum continually maintained above the diaphragm, any pressure differential on opposite sides thereof not neutralized by the spring results in movement of the diaphragm, and hence of the valve disk, to restore pressure conditions in the system to those corresponding to the setting of the brake pedal, and the extent to which the brakes are applied is thus directly under the control of the operator in substantially the same way as heretofore described with reference to the form of the invention shown in Figs. 1–5.

Mention has herein been made of the lubricant reservoir and its feeding wick, which are preferably incorporated in valves of both types, and their function of lubricating the valve disk seat and pivot briefly explained. It is contemplated, however, that an additional function be performed thereby, if desired, namely, that of supplying lubricant to the inlet and exhaust valves and upper cylinder areas of the motor and to other parts. Thus, during operation of the control valve, small quantities of oil work out into the valve ports and are drawn as a finely atomized spray with the air from the brake cylinder into the intake manifold and hence into the motor cylinders when the valve is actuated to open the vacuum ports, while the air admitted to the brake cylinder through the atmosphere ports when they are opened similarly carries with it as an atomized spray the oil working into the latter ports. In the drawings I have shown but a single wick leading from the reservoir 5 to the bore 33 which is ordinarily adequate to supply sufficient oil to properly lubricate the valve parts, but where motor and/or brake parts are to be lubricated as well in the manner just described, it may be desirable to increase the number and/or size of the wicks and of the reservoir so as to insure a larger supply of oil.

It will be apparent from the foregoing that a valve constructed in accordance with my invention may be advantageously utilized in any situation in which it is desired to produce delicate and exact control of fluid pressure in a conduit independently of that in a pressure source interconnected with the valve through another conduit, and that by the provision of control means reacting against the actuating mechanism in proportion to a pressure differential established by operation of the valve, the operator of a fluid actuated device controlled by such valve may be continually afforded sensual indication from the force applied in actuating the valve or holding it in operative position of the extent to which the device is being actuated, the pressure differential acting upon it being directly proportional to the force reacting against the valve actuating means.

It will furthermore be evident that the control of a braking system, or in fact of any other fluid actuated mechanism provided with my improved valve, is extremely flexible in that, within limits established by the fluid pressure source, any desired changes in the pressure conditions in the valve and hence in the mechanism controlled thereby may be effected by manipulation of the pedal or other valve actuating means, so that, for example, the brakes may be initially partially applied to slow down the vehicle and then fully applied to stop it, or may be initially fully applied and then partially released, and that in any case the compensating mechanism operates automatically to maintain pressure conditions corresponding to any one setting of the valve actuating means until it is changed. Moreover, the rapidity with which the compensating mechanism responds to pressure changes produced either by leakage or by manipulation of the valve permits the ports to be made of sufficient size to enable the fluid flow requisite to establish or restore the pressure conditions corresponding to any setting of the valve actuating means to be effected substantially instantaneously. Thus, I have found that automobile vacuum brakes controlled by such valve actuated by a foot pedal as herein described, may be effectively applied or the extent of their application changed in appreciably less time and with considerably greater accuracy than like brakes controlled by other means with which I am familiar.

While I have herein referred more especially to the use of the fluid control valve of my invention in vehicle braking systems of certain types, it is to be understood that it may likewise be employed in other such systems and/or in association with other sorts of fluid actuated mechanisms, and further that although I have herein shown and described certain embodiments of the invention with considerable particularity, I do not thereby desire or intend to restrict or confine myself specifically thereto as changes and modifications in the form, structure and arrangement of the various parts will readily occur to those skilled in the art and may be made if deemed advisable without departure from the spirit and scope of the invention as defined in the appended claims.

Having thus described my invention, I claim and desire to protect by Letters Patent of the United States:

1. A valve of the class described comprising means providing a valve chamber and a valve seat having a pair of ports, a rotatable valve disk associated with the seat in the chamber having a port adapted to register selectively with each of the seat ports, yielding means for actuating the disk, and means influenced by fluid pressure differences between the chamber and a space exterior thereof operable to actuate the disk in opposition to the yielding means.

2. A fluid control valve comprising a housing defining a chamber having a plurality of ports, a rotatable ported disc operable on its rotation to establish communication selectively between the chamber and one of the housing ports while interrupting communication with another thereof, actuating means for rotating the disc, and means responsive to the fluid pressure conditions in the chamber for rotating the disc in opposition to its actuating means.

3. A fluid control valve comprising a housing defining a chamber, means providing a vacuum and an atmosphere port communicating with the chamber, a rotatable ported disk controlling said ports operable selectively to close the vacuum port and open the atmosphere port and to open the vacuum port and close the atmosphere port and means for actuating said disk comprising a rod pivotally secured thereto, yielding means operative to urge the rod in one direction to thereby rotate the disc in one direction, means responsive to pressure conditions in the chamber operative to urge the rod in the opposite direction against the force of said yielding means to thereby rotate the disc in the opposite direction, and manually actuated means for moving said yielding means.

4. A fluid control valve comprising a housing, pressure responsive means carried thereby forming one wall of a chamber therein, a valve seat forming another wall of said chamber and having ports communicating therewith, a ported valve disk rotatable on said seat to selectively control said ports, means interconnecting the valve disk with said pressure responsive means operative to rotate the disk in opposite directions relatively to the seat ports in accordance with movements of said pressure responsive means, and manually operated means for moving the pressure responsive means in one direction including yielding means interposed between the manually operated means and the pressure responsive means adapted to resist movement of the latter in opposition to said manually operated means.

5. A fluid control valve comprising a housing defining a chamber and a pair of seats at opposite sides thereof, a stationary valve part having separate ports secured on one of the seats, a movable valve disk having a port adapted to register selectively with the ports in the stationary part, a pivot pin extending axially through the disk into a bore in said part and having a head overlying a portion of the disk, a cover plate secured on the other seat, means carried by said plate operative to yieldingly urge the head of the pin into engagement with the disk and toward the stationary part, a rod operable to oscillate the disk to thereby move the disk port into and out of registry with the respective ports in the stationary part, fluid pressure responsive means operative to actuate said rod in accordance with fluid pressure changes in the chamber, and manual control means operable to yieldingly move the pressure responsive means substantially independently of such pressure changes.

6. A fluid control valve comprising a housing defining a chamber and a pair of seats at opposite sides thereof, a stationary valve part having separate ports secured on one of the seats, a movable valve disk having a port adapted to register selectively with the ports in the stationary part, a pivot pin extending axially through the disk into a bore in said part and having a head overlying a portion of the disk, a cover plate secured on the other seat, means carried by said plate operative to yieldingly urge the head of the pin into engagement with the disk and toward the stationary part, a rod pivoted at one end to the disk operable to oscillate the disk to thereby move the disk port into and out of registry with the respective ports in the stationary part, a cylinder at the other end of the rod, fluid pressure responsive means secured to the cylinder and influenced by a fluid pressure differential between said chamber and a space exterior thereof operative to move the cylinder in accordance with changes in said differential to thereby correspondingly move the disk to open and close the ports in the stationary valve part, yielding means within the cylinder tending to urge it in one direction, and means engaging said yielding means manually operable to modify the influence thereof on said cylinder.

7. A fluid control valve comprising a housing defining a valve chamber, a lubricant reservoir and a pair of seats at opposite sides of the chamber, a stationary ported valve part secured on one of the seats having a bore at its center and a passage communicating therewith and terminating adjacent a wall of the housing having a hole registering with the passage and communicating with the reservoir, lubricant conducting means extending from the reservoir through the hole and the passage to said bore, a valve disk having a port adapted to register selectively with the stationary part ports and a central hole aligned with said bore, a pivot pin extending through the hole into the bore and having a head overlying the disk, a cover plate secured on the other seat, yielding means carried thereby operative to engage the pivot pin to thereby maintain snug engagement of the disk with the stationary part, a fluid pressure responsive diaphragm carried by the housing and influenced by a pressure differential between the chamber and an external space operative to move the disk about the pivot pin in substantial correspondence with changes in said pressure differential, and means for yieldingly exerting mechanical pressure on said diaphragm in one direction to oppose the influence thereof of said pressure differential.

8. A fluid control valve comprising a housing defining a valve chamber, a lubricant reservoir and a pair of seats at opposite sides of the chamber, a stationary ported valve part secured on one of the seats having a bore at its center and a passage communicating therewith and terminating adjacent a wall of the housing having a hole registering with the passage and communicating with the reservoir, lubricant conducting means extending from the reservoir through the hole and the passage to said bore, a ported valve disk adjacent the inner face of the stationary part, a pivot pin extending axially through the disk into said bore, means operative to yieldingly press the disk against said face, and means for oscillating the disk to bring the ports thereof selectively into registry with those in said part.

9. In a fluid control valve, a housing defining a valve chamber and a lubricant reservoir adjacent thereto, a stationary valve part forming a seat at one side of the chamber having spaced ports communicating therewith through the seat and a bore at its center, a closure for the other side of the chamber, a ported valve disk arranged for oscillation on the seat, means for oscillating the disk to bring its port selectively into and out of registry with the ports therein, and means operative to effect capillary passage of a lubricant from the reservoir to the bore to thereby lubricate the proximate faces of the disk and the seat.

10. A fluid control valve comprising a ported stationary part and another ported part coaxial therewith and rotatable relatively thereto, the port in the rotatable part being adapted on rotation to register selectively with different ports in the stationary part, means for rotating said rotatable part comprising a fluid pressure responsive diaphragm, means interconnecting the diaphragm and the rotatable part, manually operable means for yieldingly moving the diaphragm in one direction to rotate the rotatable part in a corresponding direction, and means adapted for connection to a fluid pressure source to establish a fluid pressure differential on opposite sides of the diaphragm to thereby urge the diaphragm in the opposite direction to rotate the rotatable part in the opposite direction.

11. A valve having a pair of chambers and comprising a flexible pressure responsive diaphragm interposed between the chambers, a rotatable valve disc in one of the chambers having a port, a stationary valve part engaged by said disc having a pair of separate ports, means interconnecting the diaphragm with the disc, means for manually yieldingly moving the diaphragm to thereby rotate the disc to bring its port into registry selectively with the other ports, said movement being capable of modification in opposition to said last mentioned means by independent movement of the diaphragm in response to a fluid pressure differential between the chambers.

JAMES B. FRANKS, Jr.